United States Patent Office 3,470,695
Patented Oct. 7, 1969

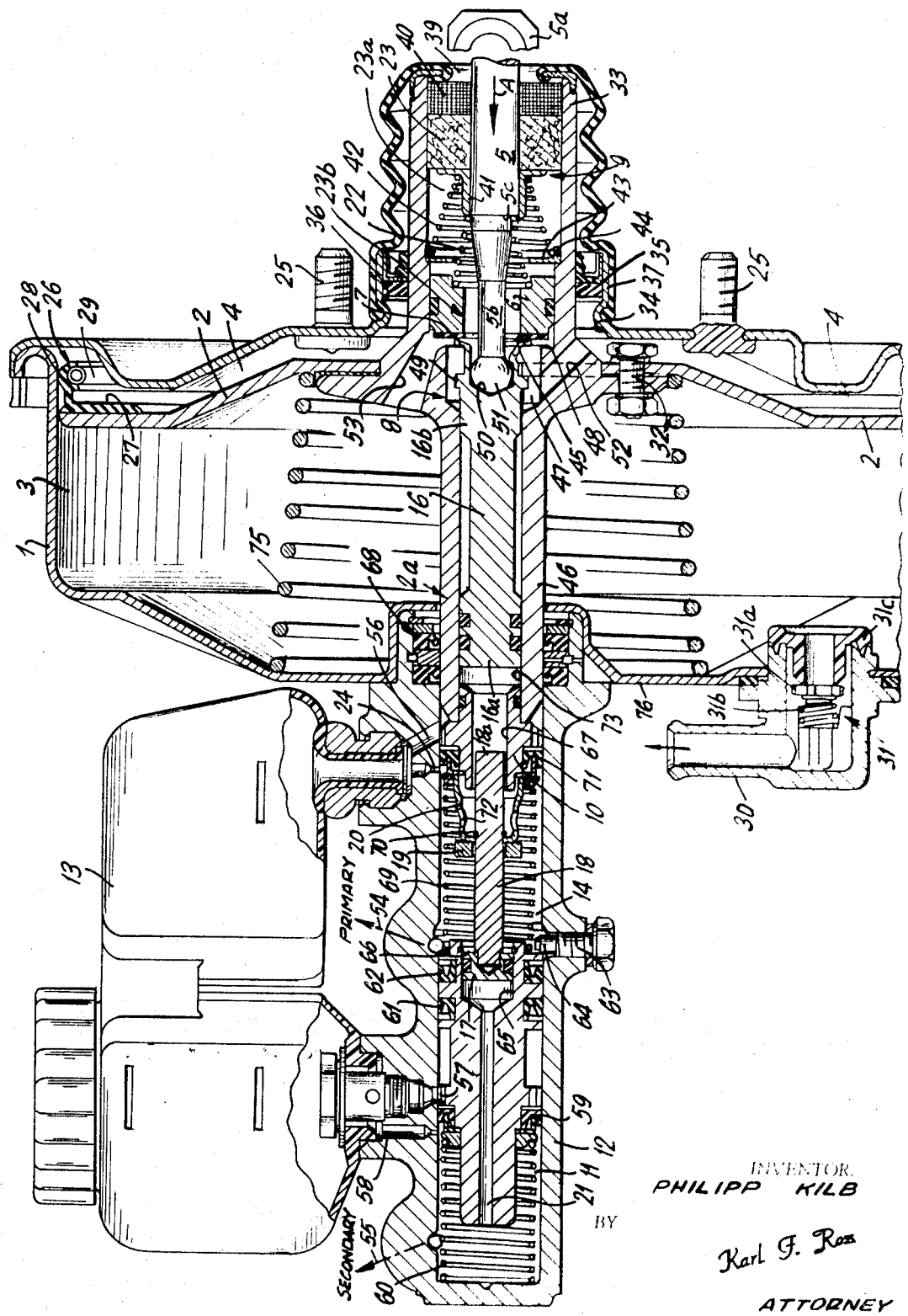

3,470,695
VACUUM-ASSIST POWER BRAKE
Philipp Kilb, Vockenhausen, Germany, assignor to Alfred Teves GmbH, Frankfurt am Main, Germany, a corporation of Germany
Filed Sept. 18, 1967, Ser. No. 668,514
Int. Cl. F15b 7/08; B60t 11/20
U.S. Cl. 60—54.5                          2 Claims

ABSTRACT OF THE DISCLOSURE

A vacuum-assist power brake having a power piston subdividing its cylinder into a chamber maintained under negative pressure by the vehicle engine and a chamber adapted to communicate with the atmosphere upon actuation of a rod, the power piston sildably receiving a reaction or feedback piston coupled with the rod and forming the valve therewith; the power piston is in force-transmitting relationship with the master-cylinder piston and the master-cylinder compartment is provided with a passage for applying pressure to the reaction piston in the direction opposite the movement of the rod for brake actuation. When the master cylinder is of the tandem type, the reaction piston is directly pressurized by one of the master-cylinder pistons and indirectly (i.e. via a fluid-actuated force-transmitting plunger) by the other.

---

My present invention relates to vacuum-assist power brakes and, more particularly, a vacuum-assist power brake of the type having a rod operable by the brake pedal and cooperating with the vacuum drum to actuate a master cylinder.

In the commonly assigned copending application Ser. No. 657,619 filed Aug. 1, 1967 by Franz Pech and Peter Spahn, there is described and claimed a vacuum-assist power-brake system having improved force-transmitting means between the actuating and output sides of the power brake. It is pointed out in that application that conventional power-brake systems of the so-called "booster" or "vacuum-assist" type have a power piston of relatively large surface area subdividing a drum-shaped housing or cylinder into a pair of working chambers. A valve body may be carried by this piston or partly formed thereby for co-operating with a slide-valve member axially shiftable by a rod coupled with the brake pedal of the vehicle for selectively blocking and unblocking a passage interconnecting the working chambers and for venting one of them to the atmosphere. The other chamber is maintained under reduced pressure by communication with the suction line of the intake manifold of the engine or some suitable reduced-pressure reservoir, preferably via a check valve sustaining a vacuum in the drum even when the engine is shut off. A force-transmitting rod between the power piston and the brake-master cylinder transmits force to the latter and enables the actuation of the hydraulic brakes with a force initiated by operation of the brake pedal and multiplied or augmented by the force applied by the gas-pressure differential to the large-diameter power piston. The force of the latter is, of course, proportional to the product of this pressure differential and the surface area of the piston. A certain amount of force may be transmitted directly to the master-cylinder piston by the actuating rod through the slide-valve member in order to provide an effective feedback between the master cylinder, actuating rod and brake pedal. In the aforementioned copending application, there is described a system whereby a "reaction disk" is disposed between the force-transmitting member and the valve body or slide-valve member, the disk yielding somewhat during compression to cushion the reaction force.

In such rod-operated vacuum-assist power brakes, a disadvantage arises from the limited play permitted between the actuating rod and the power piston, especially when the brake uses a tandem master cylinder and involves a dual-network brake system. It will be recognized that these arrangements are designed to permit one section of the master cylinder to remain effective when a failure results in the other. Under such circumstances, the increased stroke of the operative piston cannot adequately be compensated by the prior-art arrangement or the coupling between the master-cylinder piston and the power piston or between the actuating rods and the power piston. Adequate feedback of the reaction force to permit the operator to sense the braking effectiveness is not possible.

It is, therefore, the principal object of the present invention to provide an improved vacuum-assist rod-actuated power brake in which the aforementioned disadvantages are avoided.

Another object of this invention is to provide a vacuum-assist power brake using tandem master cylinders of a dual-network hydraulic brake wherein the braking effectiveness will not be adversely affected by failure of one or the other of the networks.

Still another object of this invention is to provide a power-brake assembly with improved feedback to the brake pedal, the feedback being effective even in the event of failure of one of the brake networks.

These objects and others which are apparent hereinafter can be obtained with a power-brake system which comprises the usual large-diameter brake drum or cylinder and an axially shiftable power piston subdividing this drum into a first working chamber connectable via a check valve to the suction manifold of an automotive engine and a second working chamber connectable with the atmosphere via a valve structure formed in the power-piston body and operable by an actuating rod slidably received therein, the power-piston body slidably receiving a reaction piston connected with this rod and, advantageously, forming the valve means for selectively opening and closing communication between the second compartment and the atmosphere. The power-piston body, according to this invention, extends into the master cylinder of the hydraulic wheel-brake network for actuation of a master cylinder therein while the master cylinder is formed with a passage communicating between the working chamber of the master cylinder and the reaction piston to subject the latter to direct pressurization with a force proportional to the brake pressure generated in this working chamber but in a direction counter to the direction of movement of the rod and the reaction piston during brake actuation.

Advantageously, the power-piston body bears directly against the master-cylinder piston whose effective surface area in the direction of brake actuation exceeds the surface area of the reaction piston effective in a direction opposite to its brake-actuation direction. At its opposite end, the reaction piston is formed with a sealing edge cooperating with an annular valve member shiftable by the actuating rod and retained against this edge by a spring carried by the rod until lifted from the edge for communicating between the atmosphere and the second compartment of the power cylinder. The valve means, according to this invention, thus comprises a sleeve forming a central passage connected to the atmosphere, e.g. via dust-catching filters, whose face in the direction of movement of the assembly for brake actuation carries a sealing washer engageable with the annular edge of the reaction piston opposite the end thereof subjected to fluid-pressure feedback. Another sealing edge is formed on the power-piston body and is engageable with the washer of the valve sleeve upon advance of the rod in this direction to block communication through the power-piston body between the chambers on opposite sides thereof. The valve sleeve is slidably received in this body and is entrained by the rod via a spring.

The aforedescribed assembly provides a novel feedback of the actual hydraulic brake pressure generated in the master cylinder to the actuating rod (via the reaction piston) thereby allowing the operator of the vehicle to sense the degree of braking induced when he steps upon the brake pedal. In practice, the system has been found to be highly sensitive and to permit a fine feel of brake action.

According to a further feature of this invention, the master cylinder is of the tandem type and provided with a pair of mutually and relatively slidable master-cylinder pistons each defining a respective working chamber communicating with a respective wheel-brake network. The primary master-cylinder piston is here shifted directly by the power-piston body while the secondary piston is actuated by force-transmitting means carried by the primary piston. The force transmission can be effected by an abutment of the primary piston adapted to engage the secondary piston directly in the event of failure of the primary wheel-brake network or by fluid pressure for its normal displacement. While the primary piston may be formed with a passage communicating between its working chamber and the reaction piston, the secondary piston cooperates with a force-transmitting member extending axially through the primary system and, in effect, constituting an auxiliary reaction plunger pressurizable by fluid from the working chamber of the secondary wheel-brake system in force-transmitting relationship with the reaction system for feedback of the reaction force thereto in the event of failure of the primary brake network.

These objects, features and advantages will become more readily apparent from the following description, reference being made to the accompanying drawing, the sole figure of which is an axial cross-sectional view of a vacuum-assist power brake with tandem-master cylinder embodying the present invention.

In the drawing, I show a vacuum-assist power brake which comprises a large-diameter drum 1 secured by bolts 25 to a stationary portion of the vehicle chassis and receiving a large-diameter power assist piston 2 which subdivides the interior of the cylinder 1 into a pair of working chambers 3 and 4. The piston 2 is provided along its outer periphery with a resilient seal 26 which is bonded along its web 27 to the piston body and has a bead 28 resiliently retained against the inner wall of the cylinder 1 by an outwardly spreadable spring ring 29. Chamber 3 is maintained under subatmospheric pressure or suction by the suction manifold of the engine connected by a fitting 30 with the cylinder housing 1; the fitting 30 is, in turn, formed with a check valve 31 whose valve plate 31a is retained by a spring 31b against a seat 31c. The valve 31 opens upon application of suction by the engine to the fitting 30 to permit air to be drawn through this valve and allow the compartment 3 to be evacuated. When the engine is turned off, the pressure outside chamber 3 may rise to atmospheric pressure, whereupon plate 31a is held closed to sustain the reduced pressure state in chamber 3. Chamber 4 may be selectively connected with the exterior to apply atmospheric pressure on the right-hand side of piston 2.

To control the power brake, I provide a brake-actuating rod 5 whose lug 5a may be linked to the brake pedal and which acts via a spring 22 upon an axially shiftable valve sleeve 6 to open and close communication between the atmosphere and the chamber 4. To this end, the piston 2 is bolted at 32 to a piston body generally designated 2a which has a tubular portion 33 projecting to the right, i.e. axially outwardly, from the housing 1 through an aperture 34 therein. Access of air pressure to chamber 4 through this opening 34 around the tubular portion 33 is prevented by a metal-reinforced seal 35 resting against a shoulder 36 formed in the boss 37 of housing 1 surrounding the opening and slidably engaging the external periphery of the tubular portion 33. A dust cap 38 of the bellows type is anchored at its extremities to the mouth of tubular portion 33 and the boss 37. Adjacent the mouth 39 of tubular portion 33, there is provided a porous dust-catching filter 40 through which air can pass to a perforated rigid filter ring 23 cooperating with a flanged sheet-metal sleeve 41 to form a stop in the extreme right-hand position of rod 5. Downstream of the porous body 23, the tubular portion 33 forms an air passage 23a which communicates with the annular channel 23b around the neck 5b of the rod 5 which is slidable through members 40 and 23. The rod 5 is, moreover, provided with a shoulder 5c adapted to entrain the sleeve 41 to the left and to form a seat for the conical compression spring 22 mentioned earlier. Sleeve 41, in turn, forms a seat for a further conical spring 42 received in the axial bore 9 and resting against a spring seat 43; the latter is lodged against a shoulder 44 along the inner wall of bore 9. Spring 42 acts as a restoring spring urging the rod 5 into its rest position, i.e. the position illustrated in the drawing.

The sleeve 6 is provided with a sealing washer 45 of rubber or some other elastomeric material adapted to engage the circumferential edge 7 formed by the right-hand end of a reaction piston 16 slidable in the sleeve portion 46 of the piston body 2a surrounding the annular passage 23b in the sleeve 6 when this sleeve is held to the left by the spring 22. In the alternative position of the valve, the washer 45 engages the surface 48 surrounding an axially open compartment 47 in which the head 16b of reaction piston 16 is shiftable until a shoulder 49 thereof engages the wall 8 of this recess. The reaction piston 16 is formed with a socket 50 receiving the ball-shaped head 51 of rod 5.

It will be seen that, with the valve structure in the position illustrated in the drawing, communication of air between chamber 4 and the exterior is blocked by the sealing engagement of the edge 7 of reaction piston 16 with the washer 45 of sleeve 6. When the rod 5 is displaced to the left, the reaction piston 16 can be lifted from engagement with this washer 45 when this washer rests against the edge 48 of the piston body 2a surrounding the compartment 47. Thus air may pass into opening 39 through the bodes 40 and 23 into the bore 9 of the tubular portion 33 and thence through the passage 23b around the neck of rod 5, into compartment 47 and, via a passage 52 of this piston body 2a, into working chamber 4. When, however, the edge 7 seals communication between chamber 4 and passage 23b and the washer 45 is spaced from the edge 48, communication between compartments 3 and 4 is established via a passage 53 in the piston body 2a, compartment 47 and passage 52.

The power cylinder 1 etc. of the drawing is designed to actuate a tandem master cylinder represented at 12 and having a two-compartment reservoir 13 for delivering the brake fluid to the working chambers 14, 15 of the master cylinder. In the usual manner, the tandem master cylinder 12 slidably receives a primary piston 10 ahead of which is defined the primary chamber 14, and a secondary piston 11 whose working chamber 15 is formed to the left thereof as illustrated in the drawing. The chambers 14 and 15 are connected with the respective brake networks, e.g. with opposite wheel-brake cylinders of a wheel-brake system in which each brake operates with two independently pressurizable wheel-brake cylinders, or with respective seats of front and rear-wheel brakes. Connections of this nature are conventional and may be of the type illustrated in the aforementioned copending application and are represented by the dot-dash lines 54 and 55. The compartments of the reservoir 13 communicate with the respective working chambers 14 and 15 via the usual intake ports 56 or 57 and equalizing or bypass port 24 or 58. The secondary piston 11 is formed with a gland-type seal 59 constituting the so-called primary cup of the piston and with an axially extending bore 21 communicating with the secondary chamber 15 which houses a return spring 60 resisting displacement of piston 11 in the brake-actuating direction. At its opposite axial extremity, the piston 11 is formed with a pair of oppositely effective gland-type sealing rings 61 and 62 forming the so-called secondary cup and is engageable with a piston stop constituted by a screw 63 threaded into the wall of cylinder 12 until its tip 64 lies in the path of piston 11.

The piston 11 is, moreover, provided with a cylinder bore 65 axially open toward the primary piston 10 and forming the terminus of axial bore 21 while slidably receiving a control plunger 17 is in sealing relationship therewith. A spring ring 66 behind this plunger 17 is lodged in the wall of the cylinder bore 65 to prevent withdrawal of the plunger 17 from secondary piston 11. The plunger 17 is secured to a pressure rod 18 whose free end 18a terminates in a bore 67 of the primary piston 10 at a distance (in the rest position of the system) from the forwardmost end or head 16a of reaction piston 16.

The piston body 2a is slidably retained in the tandem master cylinder 12 while sealing assemblies 68 prevent escape of hydraulic fluid around the tubular portion 46 of this body which forms a stop for the primary master-cylinder piston 10 when the latter is urged to the right by its return spring 69. Spring 69 is seated against the secondary piston 11 and bears upon a spacer sleeve 20 carrying an abutment disk 19 and a contractile split locking ring 70 which retains the rod 18 at a distance from the recation piston such that it is engaged by rod 18 only when piston 10 has been fully shifted as a reuslt of failure in its network. Member 20 also retains the sealing cup 71 against the primary piston and is perforated at 72 to permit brake fluid to flow around the rod 18 into the compartment 73 formed by the tubular body 46 between pistons 10 and 16. Thus the spacer 20 establishes the minimum closeness possible between primary piston 10 and secondary piston 11 while forming a guide for the pressure rod 18. A frustoconical coil spring 75 is disposed in suction chamber 3 and is seated against the piston 2 and the wall 76 of the cylinder housing to resist displacement of the piston 2 and restore it to its original rest position is illustrated in the drawing.

OPERATION

When the vehicle engine is in operation, the suction-manifold pressure is communicated to chamber 3 while the rod 5 is in its position illustrated in the drawing. The valve sleeve 6 is held to the left by spring 22 while the rod 5 is held to the right by spring 42. In this position of valve member 6, the washer 45 sealingly engages the edge 7 of reaction piston 16 and communication between chamber 4 and the atmosphere through opening 39 is prevented. Chamber 3, however, communicates via passage 53, chamber 47 and passage 52 with working chamber 4 so that the same pressure appears at both sides of the power piston 2. The latter is held to the right by spring 75 which also retains the piston body 2a in its right-hand position as illustrated. Springs 60 and 69 respectively urge the master-cylinder pistons 11 and 10 to their extreme right-hand positions with the piston 10 bearing against the body 2a and the piston 11 engaged with the stop 64. The hydraulic line to the respective seats of wheel-brake cylinders and networks is unpressurized while the inlet ports 56 and 57 etc. maintain the working chambers 14 and 15 of the tandem master cylinder 12 filled with brake fluid.

When the brake pedal is actuated, the rod 5 is shifted in the direction of arrow A (i.e. to the left in the drawing) thereby advancing the reaction piston 16 and the spring seat 41 to the left. Spring 42 is compressed to resist this displacement of rod 5 while spring 22 advances the valve sleeve 6 behind the piston 16 to the left until the washer 45 engages the sealing edge 48. With further movement of rod 5 and the associated reaction piston 16 to the left, the sealing edge 7 of piston 16 is lifted from the washer 45 and establishes communication between the channel 23b and chamber 47. Compartment 4 is thus vented to the atmosphere via channel 52, compartment 47, channel 23b, bore 9, porous bodies 23 and 40, and the opening 39 in the right-hand end of the tubular portion 33 of the piston body 2a. When the washer 45 engages the sealing edge 48, communication between power-brake chamber 3 and chamber 4 is cut off. Atmospheric pressure is applied to the right-hand side of piston 2 while the left-hand side thereof is under the reduced pressure of engine suction so that the piston 2 is shifted to the left with a force $F=[\Delta P \times A]-R$ where $\Delta P$ is the pressure differential across the piston 2, A is the effective surface area of this piston and R is the collective restoring force of the return springs 60, 69, 75, etc. The tubular portion 46 of piston body 2a is thus shifted to the left into the master cylinder 12 to advance the primary master-cylinder piston 10 to the left, close the equalizing bore 24 from the brake-fluid reservoir 13 and apply brake pressure to the primary wheel-brake network. The advance of piston 10 to the left also entrains the piston 11 in this direction to cut off the equalizing port 58 and force brake fluid from chamber 15 into the secondary wheel-brake network. The total force delivered to the master-cylinder pistons 10, 11 is thus equal to: $F-f$, where F is the contribution of the power cylinder and $f$ is the force applied to the system by the vehicle operator at the brake pedal.

The brake-fluid pressure in chamber 14 generated by the primary piston 10 is applied via the passage 67 to the left-hand head 16a of reaction piston 16 whose diameter is smaller than the diameter of the master cylinder 12 and whose effective surface area is less than the effective surface area in the direction of arrow A of the piston 10. Thus a reaction force is hydraulically applied to piston 16 which is movable independently of the power piston 2, 2a and also to the actuating rod 5 thereby producing a feedback allowing the vehicle operator to sense the degree of braking produced at the master cylinder. This feedback of reaction force improves the brake feel and enables complete control of the brake operation.

In the event of failure of the primary wheel-brake network, e.g. as a result of a ruptured transmission line, leaky wheel-brake or leaky wheel-brake cylinder, the actuation of the brake will permit the pressure differential across piston 2 to drive the primary piston 10 to the left until its abutment 19, affixed to the shell 72 and slidable with respect to the rod 18 engages the secondary piston 11. Piston 11 is, however, shifted to the left so that its wheel-brake network is pressurized and feeds back the reaction force via channel 21 to the piston 17, the pressure rod 18 and the reaction piston 16 which then engages the end 18a of rod 18. The feedback is thus effected even in the event of failure of the primary wheel-brake network. In the event of failure of the secondary brake network, the secondary piston 11 abuts the end of the master cylinder 12 so that the pressure in compartment 14 can feed back the reaction force to the piston 16 and the rod 5 as previously described.

The invention described and illustrated is believed to admit of many modifications within the ability of persons skilled in the art, all such modifications being considered within the spirit and scope of the appended claims.

I claim:
1. A vacuum-assist power-brake system comprising:
   a dual tandem master cylinder provided with a pair of master cylinder sections each connectable to a respective fluid-transmission network and in axially spaced relationship, said sections each being provided with a respective fluid inlet port connectable to a brake-fluid reservoir;
   a pair of tubular master-cylinder pistons received in respective sections of said master cylinder and axially displaceable therein in one direction for forcing brake fluid to the respective networks and for blocking said ports to confine brake fluid in the respective sections, said master cylinder having an open end with one of said master-cylinder pistons being disposed proximal to said open end and the other master-cylinder piston being disposed distal therefrom;

a power cylinder provided with a power piston axially aligned with said master-cylinder pistons at said open end and subdividing said power cylinder into a first working chamber communicating with a source of reduced pressure and a second working chamber adapted to communicate with the atmosphere to shift said power piston in said direction upon the application of a fluid pressure differential across said power piston, said power piston being tubular and axially engageable directly with said one of said master-cylinder pistons;

valve means operable for selectively venting said second chamber to the atmosphere and connecting said chambers together to apply and terminate the fluid pressure differential across said power piston;

an actuating rod axially aligned with said pistons and axially shiftable relatively to said power piston for controlling said valve means;

a first reaction piston directly engaging said rod and coaxially and sealingly received in said power piston while being shiftable relatively thereto and having a forward end in said direction exposed to the hydraulic fluid in the master-cylinder section of said one of said master-cylinder pistons through the latter;

abutment means on said one of said master-cylinder pistons for transferring force to the other of said master-cylinder pistons upon a failure in the network associated with the master-cylinder section of said one of said master-cylinder pistons;

a second reaction piston slidably received in said other master-cylinder piston and having a forward end in said direction exposed to the brake fluid in said master-cylinder section of said other master-cylinder piston through the latter, and a rearward end received in said one of said master-cylinder pistons in alignment with said first reaction piston and engageable therewith upon such failure;

retaining means normally maintaining a spacing between said reaction piston in the absence of such failure; and spring means in each of said sections bearing upon the respective master-cylinder pistons opposite said one direction.

2. The system defined in claim 1 wherein said valve means includes a valve member shiftable relatively to said first reaction piston and defining a passage communicating with the atmosphere, said first reaction piston having a rearward end formed with a sealing edge engageable with said valve member and surrounding said passage for blocking same, said valve member being formed as a sleeve surrounding said rod with clearance and slidably mounted in said power piston, and valve-spring means connecting said sleeve with said rod and urging said sleeve in said one direction.

References Cited
UNITED STATES PATENTS

| | | |
|---|---|---|
| 2,685,171 | 8/1954 | Price. |
| 2,763,989 | 9/1956 | Ayers. |
| 2,974,494 | 3/1961 | Rike. |
| 3,109,287 | 11/1963 | Gardner. |
| 3,159,975 | 12/1964 | Ayers. |
| 3,162,018 | 12/1964 | Daley. |
| 3,387,455 | 6/1968 | Eggstein. |

MARTIN P. SCHWADRON, Primary Examiner

R. B. BUNEVICH, Assistant Examiner

U.S. Cl. X.R.

60—54.6; 188—152